Dec. 26, 1950

W. H. BLASHFIELD

TELEPHONE DIAL TESTING BY MEANS OF AN OSCILLOSCOPE PATTERN 2,535,118

Filed Feb. 14, 1947

2 Sheets-Sheet 1

Inventor:
William H. Blashfield
By Brown, Jackson, Boettcher & Dienner
Attys.

Dec. 26, 1950 W. H. BLASHFIELD 2,535,118

TELEPHONE DIAL TESTING BY MEANS OF AN OSCILLOSCOPE PATTERN

Filed Feb. 14, 1947 2 Sheets-Sheet 2

Inventor:
William H. Blashfield
By Brown, Jackson, Boettcher & Dienner
Attys.

Patented Dec. 26, 1950 2,535,118

UNITED STATES PATENT OFFICE 2,535,118

TELEPHONE DIAL TESTING BY MEANS OF AN OSCILLOSCOPE PATTERN

William H. Blashfield, Galion, Ohio, assignor to The North Electric Manufacturing Company, Galion, Ohio, a corporation of Ohio Application February 14, 1947, Serial No. 728,464

5 Claims. (Cl. 179—175.2)

Figure 1:
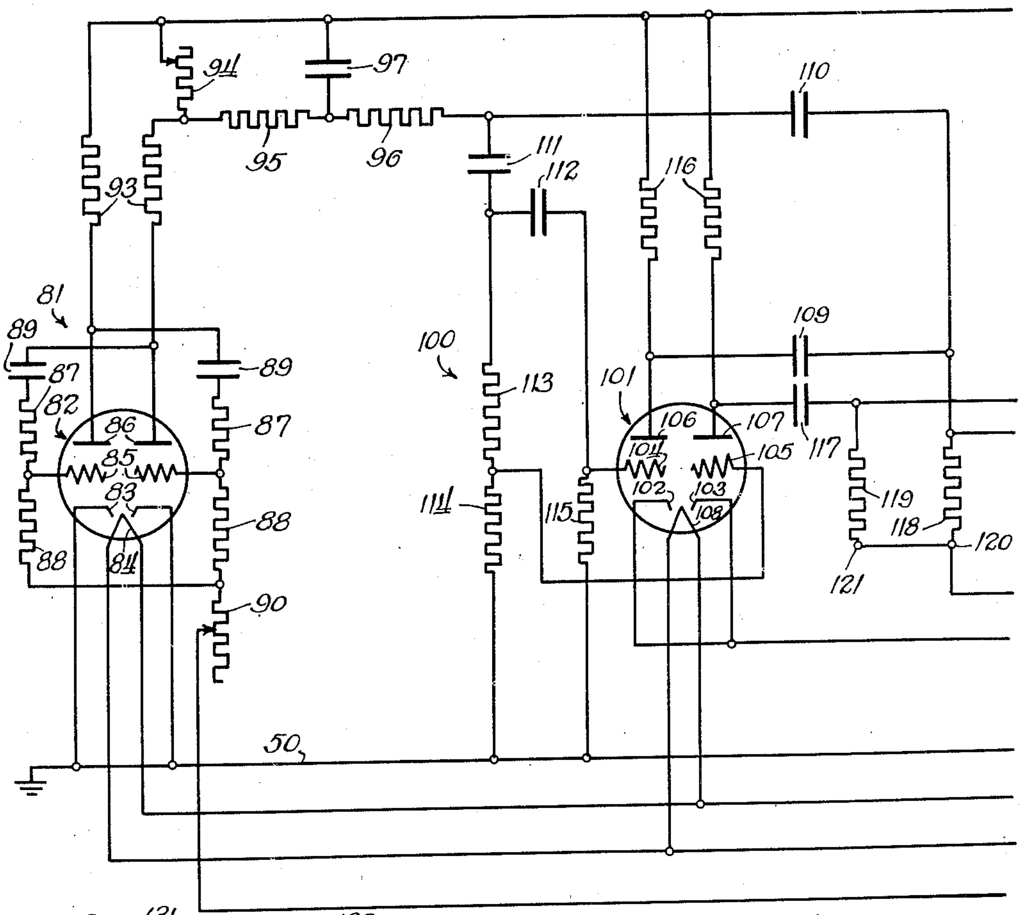

This invention relates, generally, to apparatus for testing the operation or functioning of telephone dials or the like, and it has particular relation to apparatus for checking the opening and closing of the contacts of the dial with respect to when and how the same takes place.

A telephone dial includes contacts that serve to control the functioning of the automatic telephone exchange system with which the user's telephone set is associated. It is now standard practice to design the dial so that the line can be pulsed at the rate of ten impulses per second. Each impulse or operation of the dial includes the opening and closing of its contacts.

It is important that the desired pulse rate be maintained and that there be a predetermined ratio between the time that the contacts are closed and the time that they are open during each pulse so that the telephone exchange apparatus controlled by the dial will function properly. These factors are taken care of in the design, assembly and adjustment of the dial mechanism. It is then necessary to provide means and mechanism for testing each dial to determine whether it operates or functions in accordance with the specifications or requirements.

Accordingly, among the objects of this invention are: To provide for testing or checking the operating characteristics of the contacts of a telephone dial or the like, i. e.—pulsing speed, number of pulses per second and speed variation in the run-down of the dial; to provide a visual indication of the functioning of the dial contacts in each pulse; to provide a visual indication for each pulse of the dial and to modify the same in accordance with the opening and closing of the dial contacts; to indicate the ratio between the time that the contacts are closed and the time that they are open; to indicate how the contacts open and close, i. e., whether they bounce and the extent thereof; to employ a cathode ray tube for furnishing the visual indication; to energize the deflecting plates of the tube with alternating potentials differing about ninety degrees in time phase and having a frequency corresponding to the intended dial pulse rate; to generate a circular pattern on the tube screen, one for each intended dial pulse; to modify the pattern in accordance with the opening and closing of the dial contacts; and to employ voltage divider means for applying a potential to the control electrode of the tube from a direct current source and to vary the resistance thereof by the opening and closing of the dial contacts to vary the pattern in accordance with the manner and time of operation thereof.

Other objects of this invention will, in part, be obvious and in part appear hereinafter.

This invention is disclosed in the embodiment thereof shown in the accompanying drawings, and it comprises the features of construction, combination of elements, arrangement of parts and circuit connections described in detail hereinafter and the scope of the application of which will be indicated in the appended claims.

Figure 2:
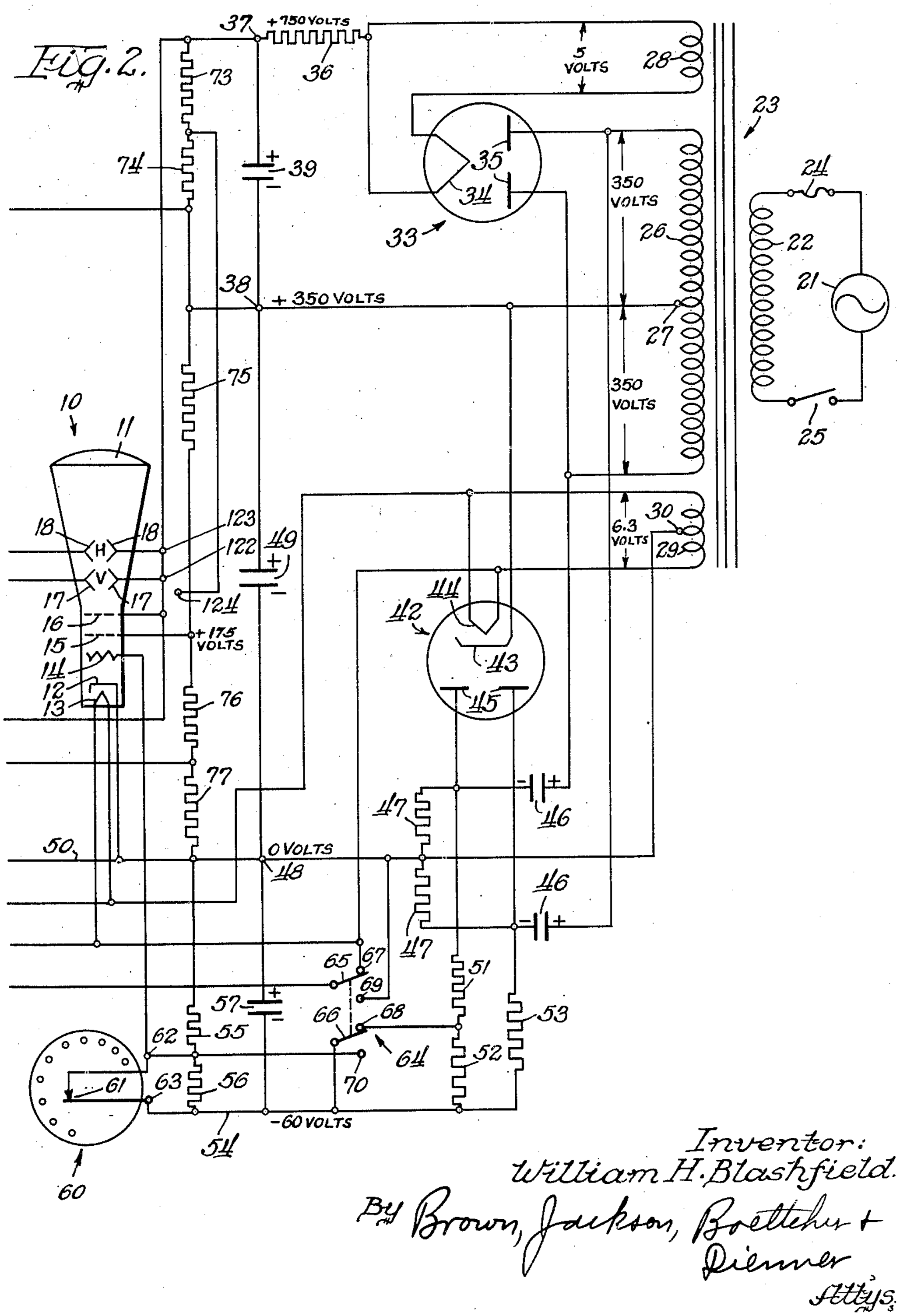

For a more complete understanding of the nature and scope of this invention, reference may be had to the following detailed description, taken together with the accompanying drawings, in which:

Figures 1 and 2, taken together in side-by-side relationship, illustrate diiagrammatically, the circuit connections that can be employed in practicing this invention; and Figures 3 through 8 illustrate different patterns on the screen of the cathode ray tube that are generated under different operating conditions.

Referring now particularly to Figure 2 of the drawings, it will be observed that the reference character 10 designates, generally, a conventional type of cathode ray tube which is available under the identification 2AP1A. The tube 10 may have a screen 11 which is impinged by a stream of electrons from a hot cathode 12 that may be maintained at the necessary operating temperature by a heater element 13. A control electrode 14 is provided for determining by its potential with respect to the cathode 12 whether or not the stream of electrons flows therefrom to the screen 11. In addition, the tube 10 may be provided with a first anode 15 and a second anode 16. The direction of the stream of electrons and thereby the pattern generated on the screen 11 is controlled by deflector plates 17 and 18. The plates 17 may be the vertical plates, while the plates 18 may be the horizontal plates. While electrostatic means, such as the deflector plates 17 and 18, are illustrated as being employed for controlling the pattern generated by the electron stream, it will be understood that magnetic means can be employed for this purpose.

It is necessary to provide relatively high direct current potentials for energizing the various elements of the cathode ray tube 10. While certain voltages will be specified hereinafter and certain values of resistance and capacitance will be set forth, it will be understood that these figures are mentioned for illustrative purposes only and that other values can be employed without departing from the spirit and scope of this invention.

The necessary high voltage direct current potentials may be obtained from a suitable source 21 of alternating current, such as a 60 cycle 110 volt source. As will appear hereinafter, this frequency may be employed as a standard frequency since the operating frequency of commercial electric power systems is regulated closely so that the departure thereof from the standard frequency of 60 cycles is negligible.

The source 21 of alternating current may be connected to energize the primary winding 22 of a transformer shown generally at 23, through a suitable fuse 24 and a manually operable switch 25. The transformer 23 may be provided with a high voltage secondary winding 26 having a mid-tap 27. The design of the transformer 23 may be such that a voltage of 350 volts appears between the mid-tap 27 and each end terminal of the winding 26 as indicated. The transformer 23 also may be provided with auxiliary secondary windings 28 and 29 between whose terminals 5 volts and 6.3 volts, respectively, may appear. The auxiliary secondary winding 29 may have a mid-tap 30.

A rectifier, shown generally at 33, preferably of type 5Y3 having a hot cathode 34 and anodes 35, may be employed for producing about 400 volts of direct potential with respect to the mid-tap 27 of the high voltage secondary winding 26. It will be observed that the cathode 34 may be connected for energization across the auxiliary secondary winding 28 and that the anodes 35 are connected to the opposite terminals of the winding 26. The output of the rectifier 33 flows through a resistor 36, having a resistance of 10,000 ohms, and appears between terminals 37 and 38 and across a capacitor 39, having a capacitance of 8 mf.

In order to produce additional high direct potential a rectifier, shown generally at 42, preferably type 6X5, may be employed having a cathode 43 that may be indirectly heated by a heater element 44, energized from auxiliary secondary winding 29, and anodes 45. The rectifier 42, in conjunction with capacitors 46, each having a capacitance of 4 mf. and resistors 47, each having a resistance of 30,000 ohms, produce a voltage at terminal 48 which is about 350 volts negative with respect to the mid-tap 27 of the high voltage secondary winding 26 or terminal 38. This voltage appears across a capacitor 49 having a capacitance of 8 mf.

As indicated, terminal 48 is grounded by conductor 50, and, for reference purposes, it may be considered to be at zero potential. Terminal 38 then has a positive potential of 350 volts applied to it while the terminal 37 has a positive potential of 750 volts applied to it.

In order to provide a negative potential for the control electrode 14 relative to the cathode 12, which it will be noted is at zero potential, resistors 51, 52 and 53 may be provided, each having a resistance of 100,000 ohms. As will appear hereinafter, the resistor 52 normally is short circuited by a switch so that resistors 51 and 53 are connected to conductor 54. The arrangement is such that, with the values of resistance and capacitance employed, a potential of 60 volts appears between the conductors 50 and 54, the latter being 60 volts negative with respect to the former. This 60 volts is applied across a voltage divider, comprising resistors 55 and 56, the former having a resistance of 100,000 ohms and the latter having a resistance of 560,000 ohms. This potential also appears across a capacitor 57 having a capacitance of 0.05 mf.

The control of the potential applied to the control electrode 14 and thereby of the electron stream which impinges on the screen 11 may be controlled by a dial mechanism that may be indicated, generally, at 60. This mechanism includes normally closed contacts 61 which may be connected to terminals 62 and 63 that, in turn, are connected across voltage divider resistor 56.

As set forth hereinbefore, the dial mechanism 60 is arranged to operate at a pulse rate of ten pulses per second. Each pulse includes the time during which contacts 61 are open and closed. It is required that the dial mechanism 60 operate at such a predetermined fixed pulse rate and that there be a predetermined ratio between the time that the contacts 61 are closed and the time that they are open during each pulse.

In accordance with the present invention, when the contacts 61 of the dial mechanism 60 are closed, resistor 56 is short circuited and a negative potential of 60 volts is applied to the control electrode 14 with respect to the cathode 12. This prevents the flow of electrons from the cathode 12 to the screen 11. Conversely, when the contacts 61 are open, the potential of control electrode 14 is only slightly negative with respect to the cathode 12 and, as a result, the stream of electrons is allowed to flow from the cathode 12 to generate the patterns on the screen 11 that will be described in detail hereinafter.

In order to calibrate the 10 cycle generator that is employed for applying out of phase alternating potentials to the deflector plates 17 and 18, the calibrating switch, shown generally at 64, may be provided. For a normal operating condition, the switch 64 is in the position shown in Figure 2. The switch 64 may have blades 65 and 66 that normally engage contacts 67 and 68. In the alternate position, the switch blades 65 and 66 are arranged to engage contacts 69 and 70. It will be observed that, in the position shown in the drawings, the resistor 52 is short circuited by the switch blade 66.

The 750 volts potential obtained by the rectifiers 33 and 42 from the high voltage secondary winding 26 may be distributed by voltage divider resistors 73 through 77. These resistors may have resistances, respectively, as follows: 15,000, 270,000, 47,000, 47,000, and 560 ohms.

With a view to energizing the deflector plates 17 and 18 with out of phase alternating potentials having a frequency which is the same as the pulse rate of the dial mechanism 60, a suitable electronic generator or multivibrator, shown generally at 81, may be employed. The generator 81 may include a valve of the 6SL7 type indicated at 82. The valve 82 may have indirectly heated cathodes 83 that are maintained at the required operating temperature by a heater element 84, energized from the auxiliary secondary winding 29 of the transformer 23. The valve 82 also may include control electrodes 85 and anodes 86. The control electrodes 85 may be connected to the common connections between resistors 87 and 88 which may have resistances, respectively, of 830,000 and 100,000 ohms. The resistors 87 are employed to improve the wave form of the generator and to reduce the peak voltages appearing on the control electrodes 85. The control electrode circuits 85 include capacitors 89, each having a capacitance of 0.05 mf. An adjustable resistor 90, having a resistance of 100,000 ohms, controls the time constant of the circuits through which the capacitors 89 charge and discharge and hence the frequency of oscillation of the generator or multivibrator 81.

The output of the generator or multivibrator 81 is fed through resistors 93 each having a resistance of 100,000 ohms, across a variable resistor 94, having a resistance of 20,000 ohms, which may be employed to control the output. The output of the generator or multivibrator 81 is then applied through a network comprising resistors 95 and 96, having resistances, respectively, of 47,000 and 680,000 ohms and a capacitor 97 having a capacitance of 0.05 mf., to a tuned-feed-back amplifier and phase splitter, illustrated generally at 100.

The amplifier and phase splitter 100 includes a valve 101 which may be of the same type as the valve 82, and may have indirectly heated cathodes 102—103, control electrodes 104—105, and anodes 106—107. A heater element 108, energized from the auxiliary secondary winding 29, may be employed for maintaining cathodes 102—103 at the required operating temperature.

The left-hand section of the valve 101 may be connected to a feed-back network comprising capacitors 109, 110, 111 and 112, having capacitances, respectively, of 0.05, 0.01, 0.02 and 0.02 mf.

Since the generator or multivibrator 81 is designed to generate a frequency of 10 cycles per second, corresponding to the ten pulses per second for the dial mechanism 60, these capacitors together with associated resistors 113, 114 and 115 having resistances respectively of 1 megohm, 270,000 ohms and 150,000 ohms cause a phase shift of one hundred and eightly degrees. This feed-back adds to the input signal applied to the valve 101 and increases the gain of the amplifier. The potential for the anodes 106—107 may be supplied through resistors 116. At higher frequencies than 10 cycles per second, the impedance of the capacitors 109 through 112 is relatively low and the phase shift is correspondingly small. As a result, the feed-back is degenerative and for these frequencies, the amplifier gain is reduced. This is important when it is understood that the generator or multivibrator 81 produces a square wave which should be converted to a sine wave for controlling the pattern appearing on the screen 11. The result is that the higher harmonics in the square wave frequency applied to the amplifier and phase splitter 100 are removed, leaving a substantially pure sine wave output at the desired frequency of 10 cycles per second.

Since it is desired that the alternating potential applied to the deflector plates 17 be about ninety degrees out of phase with the alternating potential applied to the plates 18, the control electrode 105 is connected, as shown, between the resistors 113 and 114. The phase shift caused by capacitor 112, together with the additional phase shift caused by common cathode resistor 77, causes the output potentials of the two sections of the valve 101 to be about ninety degrees out of phase with each other. The output of the left-hand side of the valve 101 is applied through capacitor 109 to the vertical deflector plates 17 while the output of the other side may be applied through capacitor 117, having a capacitance of 0.05 mf. to the horizontal deflector plates 18.

The deflector plates 17 and 18 may be bridged by resistors 118—119, each having a resistance of 1 megohm. It will be observed that resistors 118 and 119 have terminals 120 and 121. Also, it will be noted that the right-hand deflector plates 17 and 18 have terminals 122 and 123. These terminals 120 through 123 may be connected with the second anode 16 to the positive 750 volt terminal 37. If it is necessary to center the pattern appearing on the screen 11, any one of the terminals 120 through 123 may be connected to a terminal 124 so that the voltage drop appearing across the resistor 73 may be employed for shifting the position of the pattern on the screen 11 as may be desired.

When the calibrating switch 64 occupies the normal position shown in Figure 2, it will be observed that the resistor 90 which adjusts the frequency of the generator or multivibrator 81, is connected to one terminal of the auxiliary winding 29 so that a 60 cycle voltage of about three volts is superimposed on the potential between the cathodes 83 and the control electrodes 85. This causes the generator or multivibrator 81 to lock in step with the standard 60 cycle frequency and thereby maintain the required frequency in the out of phase potentials applied to the deflector plates 17 and 18 of the cathode ray tube 10.

Figures 3, 4, 5, 6:
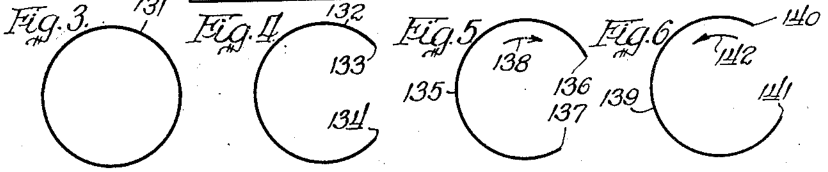

When the generator or multivibrator 81 is supplying a sine wave frequency of 10 cycles per second to the deflector plates 17 and 18 of the cathode ray tube, and it is energized as described hereinbefore, with the dial mechanism 60 disconnected from the terminals 62—63 or the contacts 61 are open, the pattern appearing on the screen 11 is in the form of a circle as indicated at 131 in Figure 3. The circle 131 is formed by the luminous spot caused by the stream of electrons impinging on the screen 11 traversing a complete circle ten times each second. This gives the appearance of a continuous pattern, as indicated at 131, although, in reality, it is caused as described.

Now, when the dial mechanism 60 is connected to the terminals 62—63 and the dial operated to cause the contacts 61 to open and close at the pulse rate of ten pulses per second, the sweep appears as indicated at 132 in Figure 4. When the contacts 61 open, the short circuit across resistor 56 is removed and the stream of electrons is permitted to flow from the cathode 12 to the screen 11. The instant that this occurs is indicated at 133, or at the beginning of the luminous arcuate portion of pattern 132, it being assumed that the pattern is generated in a counterclockwise direction, as viewed in Figure 4 and similar figures of the drawings. The circular pattern continues until, as indicated at 134, contacts 61 are closed, thereby short circuiting resistor 56 and applying sufficient negative potential to the control electrode 14 with respect to the cathode 12 so that the emission of the stream of electrons therefrom for impinging on the screen 11 is prevented.

Figure 5 illustrates the pattern 135 as it appears when the dial pulse rate is higher than ten pulses per second. Under these assumed conditions, in each pulse, the contacts 61 are closed earlier as indicated at 136, and likewise, open earlier as indicated at 137. The pattern 135 then appears to rotate in the clockwise direction as indicated by the arrow 138.

When the pulse rate of the dial mechanism 60 is less than the prescribed ten pulses per second, the pattern 139 in Figure 6 illustrates this behavior. As indicated at 140, the contacts 61 in each pulse, close later and, as indicated at 141, they open later so that the pattern 139 appears to rotate in a counterclockwise direction, as indicated by arrow 142.

Figures 7, 8:
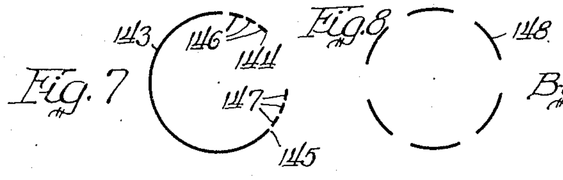

In Figure 7, the pattern 143 shows that the contacts 61 bounce when they open and close. It is assumed that the dial pulse rate is exactly ten pulses per second although it will be understood that the bouncing of the contacts may occur and will show up at other speeds. Under the assumed conditions, closure of the contacts 61 is indicated at 144 and the opening at 145. The luminous spots 146 and 147 indicate the bouncing of contacts 61 in the opening and closing.

While the pattern appearing on the screen 11 has been described as circular, it may and usually does depart somewhat from this configuration. It may be distorted somewhat but it is continuous when the resistor 56 is short circuited and may have an elliptical or like shape as is readily understood.

The use of the testing apparatus, as illustrated in the drawings and described hereinbefore, is not limited to the checking of the operation of the contacts of telephone dials. It may be employed also for testing the operation of relays, such as switchboard dialing relays, relay senders, pulse corrector relays and the like employed in automatic telephone exchange apparatus. For such relays it is possible to determine pulsing rate, including short time variations as well as the average rate, the ratio between the time of make and time of break of the contacts for each pulse, and the degree of contact bounce.

In order to calibrate the generator or multivibrator 81, the calibrating switch 64 is operated to the alternate position. When this is done, it will be observed that the synchronizing 60 cycle voltage from the source 21 is removed from the resistor 90 and that it is connected by switch blade 65 through contact 69 to the cathodes 83. As a result the generator or multivibrator 81 runs free. The other blade 66 of switch 64 at contact 70 short circuits resistor 56 and at contact 68 opens the short circuit around resistor 52. As a result of the unbalance created by the addition of resistor 52 in series with resistor 51, a large 60 cycle ripple is superimposed on the direct current potential applied to the control electrode 14 of the cathode ray tube 10. This 60 cycle ripple has the effect of preventing and permitting the stream of electrons to impinge on the screen 11 sixty times a second thereby creating the six segment pattern 148, as illustrated in Figure 8 of the drawings. If the resistance of resistor 90 is adjusted so that the free running frequency of the generator or multivibrator 81 is exactly 10 cycles per second, then the pattern 148, as indicated in Figure 8, will remain stationary. If the frequency of the generator or multivibrator 81 is higher or lower than the desired 10 cycles per second, the pattern 148 appears to rotate in one direction or the other depending upon whether the frequency is higher or lower than the 10 cycles per second. The resistor 90 then can be adjusted until the pattern 148 remains stationary. Thereafter, the system being properly calibrated, the calibrating switch 64 may be restored to the normal position shown in Figure 2 of the drawings.

Since certain further changes can be made in the foregoing construction and circuits without departing from the spirit and scope of this invention, it is intended that all matter shown in the accompanying drawings and described hereinbefore shall be interpreted as illustrative and not in a limiting sense.

What is claimed as new is:

1. In apparatus for testing the dialing contacts of an automatic telephone dial which are intended to have a predetermined pulsing rate of a certain number of make-break operations per second and are also intended to have a predetermined ratio of make interval to break interval in each make-break operation, the combination of a cathode ray tube comprising a screen rendered luminous by an electron beam, two pairs of deflecting plates located on axes normal to each other for determining the pattern produced by the electron beam, and a control electrode for interrupting or diminishing the beam, sweep control means for energizing said pairs of plates by the application thereto of sine waves of potential about ninety degrees in time phase apart for producing a substantially circular pattern on said screen, spot control means comprising a source of blocking potential for connection with said control electrode, a pair of connector terminals for connection with the telephone dial, and means interconnecting said source of potential with said connector terminals and dial contacts whereby when the dial contacts are closed a negative blocking potential is applied to said control electrode to substantially block said electron beam and create a gap in said circular pattern, and frequency control means coacting with said sweep control means for controlling the frequency of said sweep sine waves to cause said electron beam to rotate the same number of revolutions per second as the intended pulsing rate per second of the dial contacts, whereby forward or backward rotation of said gap in said circular pattern indicates variations of dial speed from the intended pulsing rate, and whereby the length of said gap in the circular pattern indicates the make-break ratio of said dial contacts.

2. In apparatus for testing the dialing contacts of an automatic telephone dial which are intended to have a predetermined pulsing rate of a certain number of make-break operations per second, and are intended to have a predetermined ratio of make interval to break interval in each make-break operation, the combination of a cathode ray tube comprising a screen rendered luminous by an electron beam, two pairs of deflecting plates located on axes normal to each other for determining the pattern produced by the electron beam, and a control electrode for substantially blocking the beam, sweep control means for generating alternating potential sine waves approximately ninety degrees in time phase apart for application to said pairs of plates so as to produce a substantially circular luminous pattern on said screen, spot control means comprising a direct current source of blocking potential for application to said control electrode, a pair of connector terminals, a telephone dial connected therewith with the dial contacts opening and closing a circuit across said connector terminmals, and voltage divider means interconnecting said source of direct current potential with said connector terminals and dial contacts whereby when the dial contacts are closed a negative blocking potential is applied to said control electrode so as to block said electron beam and thereby create a gap in said circular pattern, and frequency control means connected with said sweep control means for controlling the frequency of said sweep sine waves so as to cause said electron beam to rotate the same number of revolutions per second around said screen as the intended pulsing rate per second of the dial contacts, whereby forward or backward rotation of said gap in said circular pattern indicates variations of dial speed from the intended pulsing rate, whereby the length of said gap indicates the make-break ratio of said dial contacts, and whereby interruptions in said circular pattern beyond one end of said gap signify bounce or irregularities in the operation of said contacts.

3. In apparatus for testing the dialing contacts of an automatic telephone dial which are intended to have a pulsing rate of approximately ten pulses per second, and to have a predetermined ratio of make interval to break interval in each pulsing operation, the combination of a cathode ray tube comprising a screen rendered luminous by an electron beam, two pairs of deflecting plates located on axes normal to each other for determining the pattern produced by the electron beam, and a control electrode for blocking said electron beam, a multivibrator for generating an alternating potential output, a phase splitter receiving the output of said multivibrator and producing sine waves of potential about ninety degrees apart applied to said pairs of plates for producing a substantially circular luminous pattern on said screen, spot control means comprising a direct current source of blocking potential applied to said control electrode, a pair of connector terminals connected in shunting relation across the dialing contacts of said telephone dial, voltage divider means interconnecting said source of direct current potential with said connector terminals and dial contacts whereby when the dial contacts are closed a negative blocking potential is transmitted to said control electrode which blocks said electron beam and thereby creates a gap in said circular luminous pattern, and means adjustably controlling the frequency of said multivibrator so that the frequency of said sweep sine waves will cause said electron beam to rotate approximately ten revolutions per second, whereby forward or backward rotation of said gap in said circular pattern will indicate variations of dial speed from the intended pulsing rate of ten pulses per second, and whereby the length of said gap will indicate the make-break ratio in each make-break operation.

4. In apparatus for testing the dialing contacts of an automatic telephone dial which are intended to have a pulsing rate of approximately ten pulses per second, and to have a predetermined ratio of make interval to break interval in each pulsing operation, the combination of a cathode ray tube comprising a screen rendered luminous by an electron beam, two pairs of deflecting plates located on axes normal to each other for determining the pattern produced by the electron beam, and a control electrode for blocking said electron beam, a multivibrator for generating an alternating potential output, a phase splitter receiving the output of said multivibrator and producing sine waves of potential about ninety degrees apart applied to said pairs of plates for producing a substantially circular luminous pattern on said screen, spot control means comprising a direct current source of potential applied to said control electrode, a pair of connector terminals, an automatic telephone dial having its dialing contacts connected in shunting relation across said connector terminals, voltage divider means interconnecting said source of direct current potential with said connector terminals and dial contacts whereby when the dial contacts are closed they transmit a negative blocking potential to said control electrode so that the latter blocks said electron beam and thereby creates a gap in said circular luminous pattern, and means utilizing a standard 60 cycle alternating current from a commercial light or power circuit for controlling the frequency of the output from said multivibrator, the frequency of the output from said multivibrator being predetermined to cause said electron beam to rotate substantially ten revolutions per second over said screen corresponding to the intended pulsing rate of ten pulses per second at the dial contacts, whereby forward or backward rotation of said gap in said circular pattern indicates variations of dial speed from the intended pulsing rate, whereby the length of said gap indicates the make-break ratio in each pulsing operation, and whereby interruptions in the continuity of said circular pattern beyond one end of said gap signify bounce or other irregularities in the operation of said contacts.

5. The invention, as set forth in claim 1, wherein the apparatus comprises means for giving a continuous momentary testing of each pulse of said dialing contacts.

WILLIAM H. BLASHFIELD.

REFERENCES CITED

The following references are of record in the file of this patent:

UNITED STATES PATENTS

| Number | Name | Date |
|---|---|---|
| 2,083,495 | Black | June 8, 1937 |
| 2,121,359 | Luck | June 21, 1938 |
| 2,178,074 | Jakel | Oct. 31, 1939 |
| 2,207,513 | Hadfield | July 9, 1940 |
| 2,425,600 | Coykendall | Aug. 12, 1947 |